US005643071A

United States Patent [19]
Williams et al.

[11] Patent Number: 5,643,071
[45] Date of Patent: Jul. 1, 1997

[54] APPARATUS FOR COLLECTING SAUSAGE CASINGS

[75] Inventors: Jeffrey A. Williams, Calhoun, Ga.; Charles E. Miller, West Point, Miss.

[73] Assignee: Sara Lee Corporation, Winston-Salem, N.C.

[21] Appl. No.: 556,202

[22] Filed: Nov. 9, 1995

[51] Int. Cl.⁶ .................................................. A22C 13/00
[52] U.S. Cl. ........................................................... 452/50
[58] Field of Search ............................................... 452/50

[56] References Cited

U.S. PATENT DOCUMENTS

| | | | |
|---|---|---|---|
| 2,725,591 | 12/1955 | Cline et al. | 452/50 |
| 2,954,579 | 10/1960 | Menghini | 452/50 |
| 3,312,995 | 4/1967 | Garey | 452/50 |
| 3,487,499 | 1/1970 | Klyce | 452/50 |
| 3,895,414 | 7/1975 | Klyce | 452/50 |
| 4,414,707 | 11/1983 | Koken | 452/50 |
| 4,682,387 | 7/1987 | Leining | 452/50 |
| 5,094,649 | 3/1992 | Hall et al. | 452/50 |
| 5,295,895 | 3/1994 | Klyce et al. | 452/50 |

*Primary Examiner*—Willis Little
*Attorney, Agent, or Firm*—Kilpatrick Stockton LLP

[57] ABSTRACT

An apparatus for collecting sausage casings or the like from a peeling station which utilizes selectively operable storage tanks for receiving the peeled casings from the peeling station connected to the peeling station by conduits through which moved peelings can be transported by air flow induced from a vacuum source. The receiving tanks each having two interior walls and an exterior wall, one of the interior walls being perforated to permit air flow to move therethrough. The second interior wall forms an air flow passage with the exterior wall to direct air flow induced by the vacuum through the casing outlet means. Each tank has a selectively openable door to discharge collected casings for removal to a remote location.

13 Claims, 5 Drawing Sheets

APPARATUS FOR COLLECTING SAUSAGE CASINGS

BACKGROUND OF THE INVENTION

1. Field of the Invention.

The present invention relates generally to collection of sausage casings or the like and is particularly directed to an apparatus for collecting peeled sausage casings and conditioning them for removal to a remote location.

2. Description of the Prior Art.

There are a number of machines well-known in the art that are used to peel casings from a string of sausages, frankfurters or the like. Examples of such machinery are shown in U.S. Pat. Nos. 4,118,828; 4,414,707; and 3,312,995. Once the casings have been split, they are removed from the sausages by strategically directed air streams or, in some cases, a suction pump. For the latter, see U.S. Pat. No. 3,312,995. While these devices have operated satisfactorily over the years, there is always some problem associated with the removal and collection of peelings either because machinery utilized to effect such peelings is not highly efficient or the collection process must be terminated from time to time to enable the removal of a collection of casings that might otherwise become troublesome to the overall operation of the system.

Because of increasing safety standards and a higher demand for sanitary conditions within food processing facilities, there is a need to provide more efficient equipment for casing removal and evacuation that will eliminate the stoppages normally attendant with such processes and maintain the premises in a highly sanitary and otherwise healthy condition. The present application is directed to that need.

SUMMARY AND OBJECTIVES OF THE INVENTION

The present invention is formed by utilizing two cylindrical tanks cooperatively connected to a sausage peeling mechanism of suitable construction wherein the tanks collect and receive peeled casings from the peeling station through conduits of suitable size. The tanks each have two interior walls and an exterior wall, one of the interior walls cooperating with the exterior wall to form an air passage therebetween for air flow induced by selectively created vacuums. Separated peel casings then move from the peeling station into the storage area which has an associated selectively openable lid. The tanks are selectively operable to enable one tank to be activated while the other tank is deactivated and so on. Appropriate devices are then utilized to collect the accumulated casings from each storage tank and move them to a remote location for appropriate disposal.

In the foregoing brief summary it will be appreciated that the primary objective of the present invention is to create a casing collecting device that will more efficiently and reliably accumulate peeled casings and assist in their removal to a remote location.

Another objective of the present invention is to provide a collecting apparatus of the type described which utilizes a plurality of selectively activateable tanks to enable prolonged operation without shut down and continuous collection and removal of peeled casings.

Yet another objective of the present invention is to provide an apparatus of the type described which utilizes two interior walls, one of which is operable with the exterior wall to form an air passage to accommodate air flow induced by selectively operable vacuum.

Thus, there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the arrangement of the components set forth in the following description or illustrated in the drawings. The invention is capable of other embodiments and of being practiced and carried out in various ways.

It is also to be understood that the phraseology and terminology employed herein are for the purpose of description and should not be regarded as limiting in any respect. Those skilled in the art will appreciate that the concept upon which this disclosure is based may readily be utilized as the basis for designing other structures, methods and systems for carrying out the several purposes of this development.

It is important that the claims be regarded as including such equivalent methods and products resulting therefrom that do not depart from the spirit and scope of the present invention. The application is neither intended to define the invention of the application, which is measured by its claims, nor to limit its scope in any way.

Thus, the objects of the invention previously set forth along with the various features of novelty which characterize the invention, are noted with particularity in the claims annexed to and forming a part of this disclosure. For a better understanding of the invention, its operating advantages and the specific results obtained by its use, reference should be made to the following detailed specification taken in conjunction with the accompanying drawings wherein like characters of reference designate like parts throughout the several views.

DETAILED DESCRIPTION OF THE PREFERRED EMBODIMENT

Figure 1:
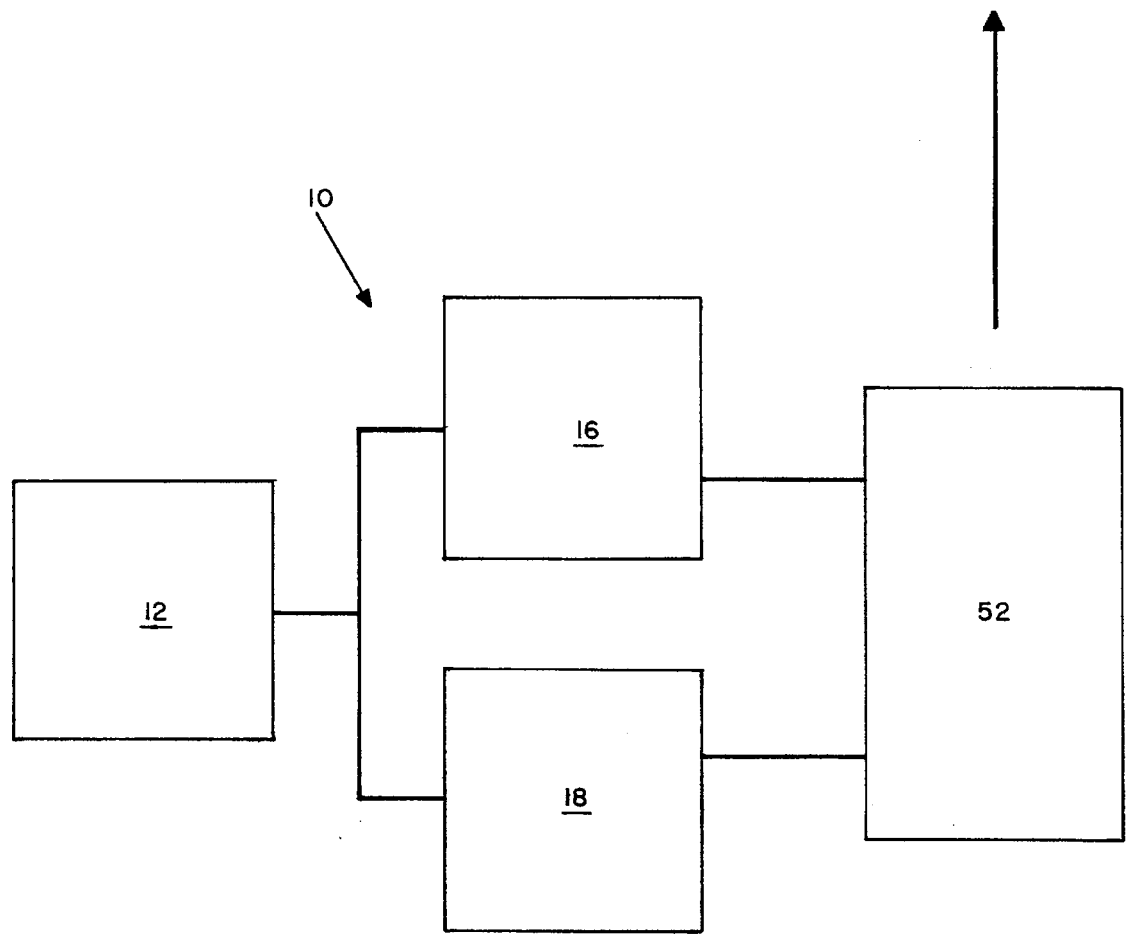
FIG. 1 is a block diagram showing the operational steps involved in peeling casings, removing the peeled casings and collecting casings through an apparatus appropriately designed for that function.
Figure 2:
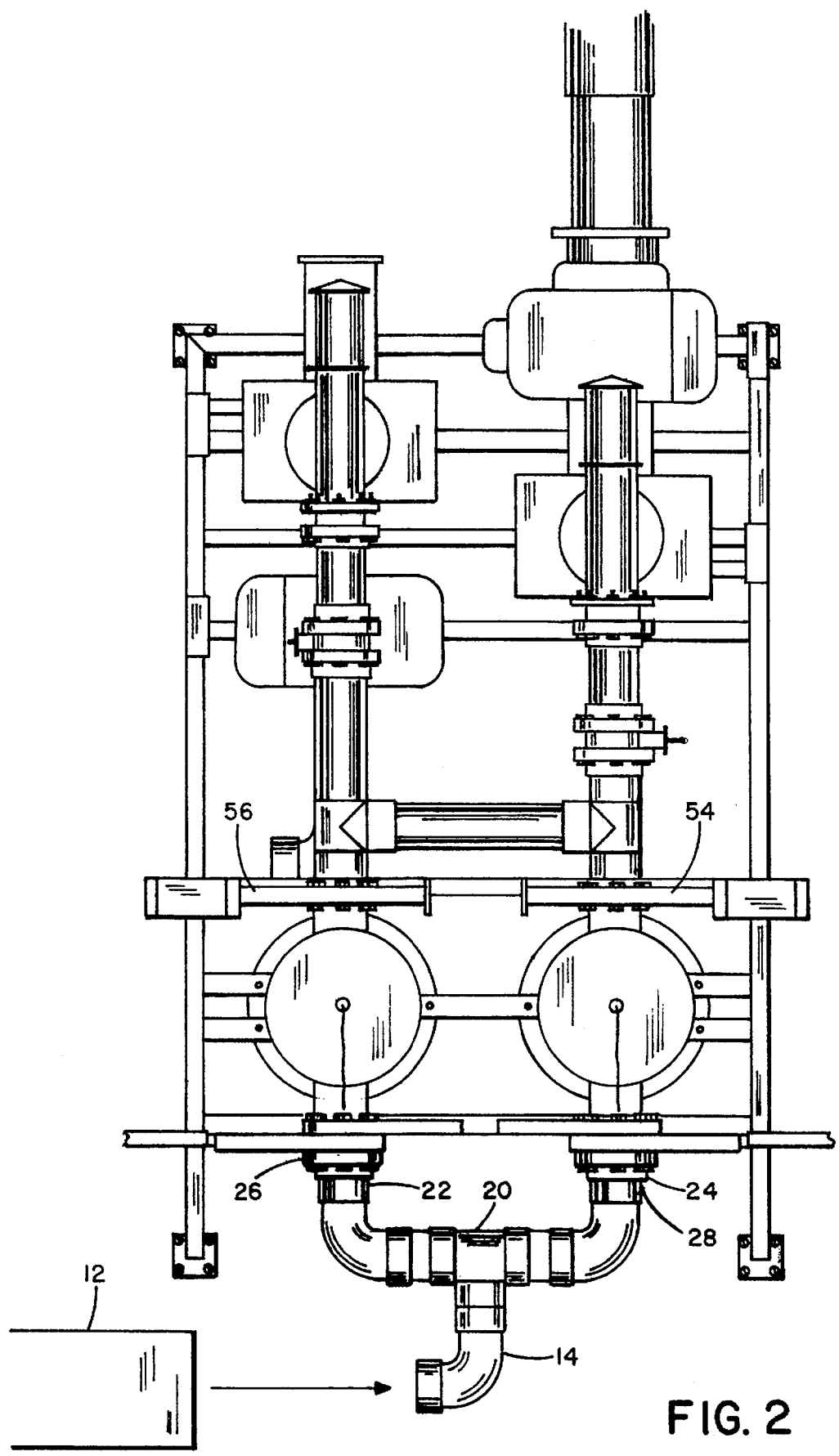
FIG. 2 is a plan view of the plural tank means for receiving peel casings from the casing peeling station.
Figure 3:
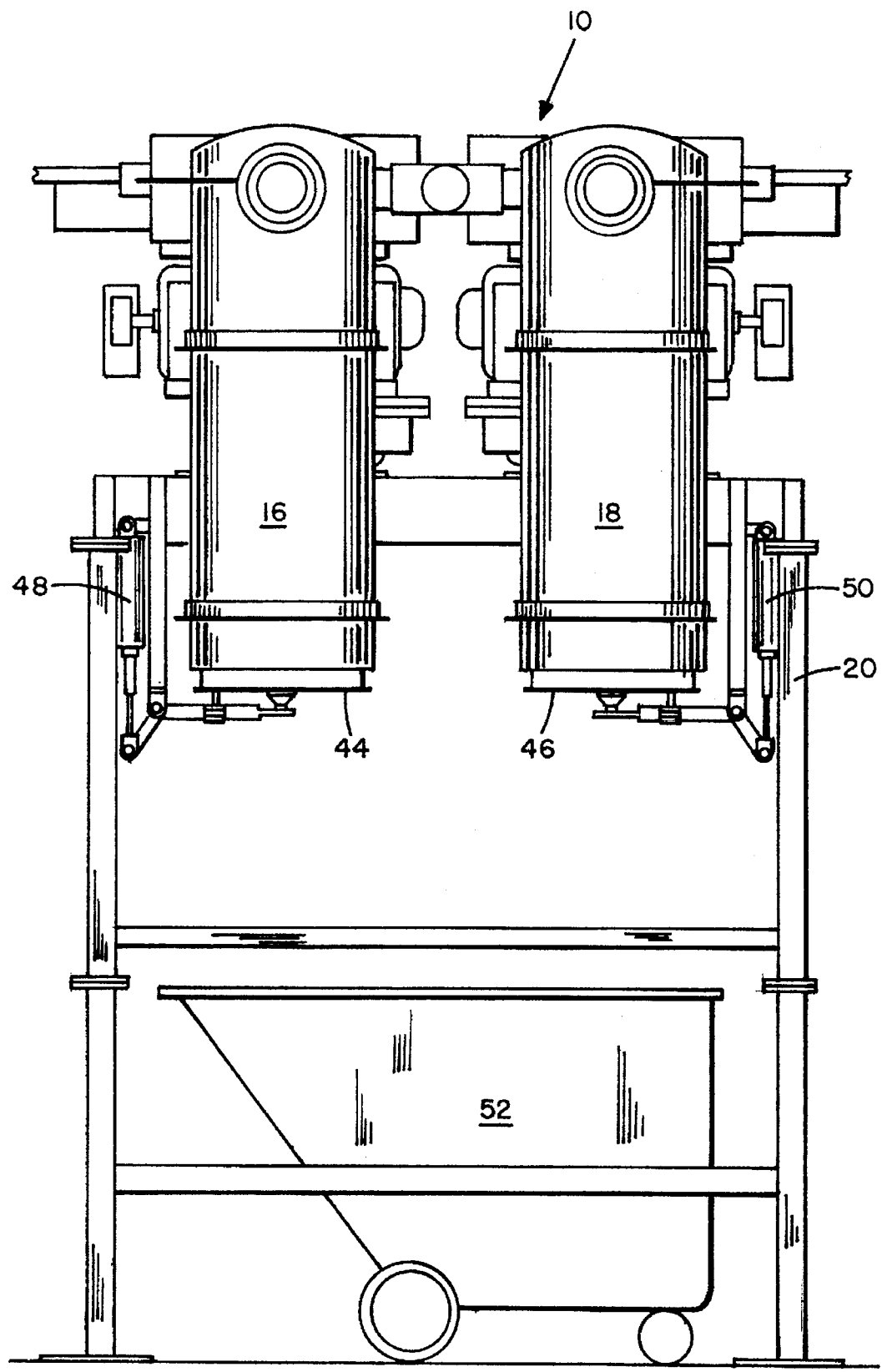
FIG. 3 is an end elevational view of the apparatus shown in FIG. 2.

Referring now to the drawings and particularly to FIGS. 1 and 3, a sausage casing collecting apparatus shown generally as 10 is positioned in proximity to a sausage peeling mechanism 12 which discharges peeled casings and moves them through an appropriate conduit 14 to plural collecting tanks 16, 18 positioned in a side-by-side relationship and connected in parallel to selectively receive peeled casings for subsequent discharge. The tanks are mounted in an elevated position on a frame 20 so they may be gravity emptied from time to time as the apparatus is continuously operated. Conduit 14 through which casings pass from the peeler forms a T connection with conduit 20, the ends 22, 24 of which are selectively openable and closeable by valve 26, 28. Conduits 22, 24 extend onwardly from valves 26, 28 to tanks 16, 18 as shown.

Figure 4:
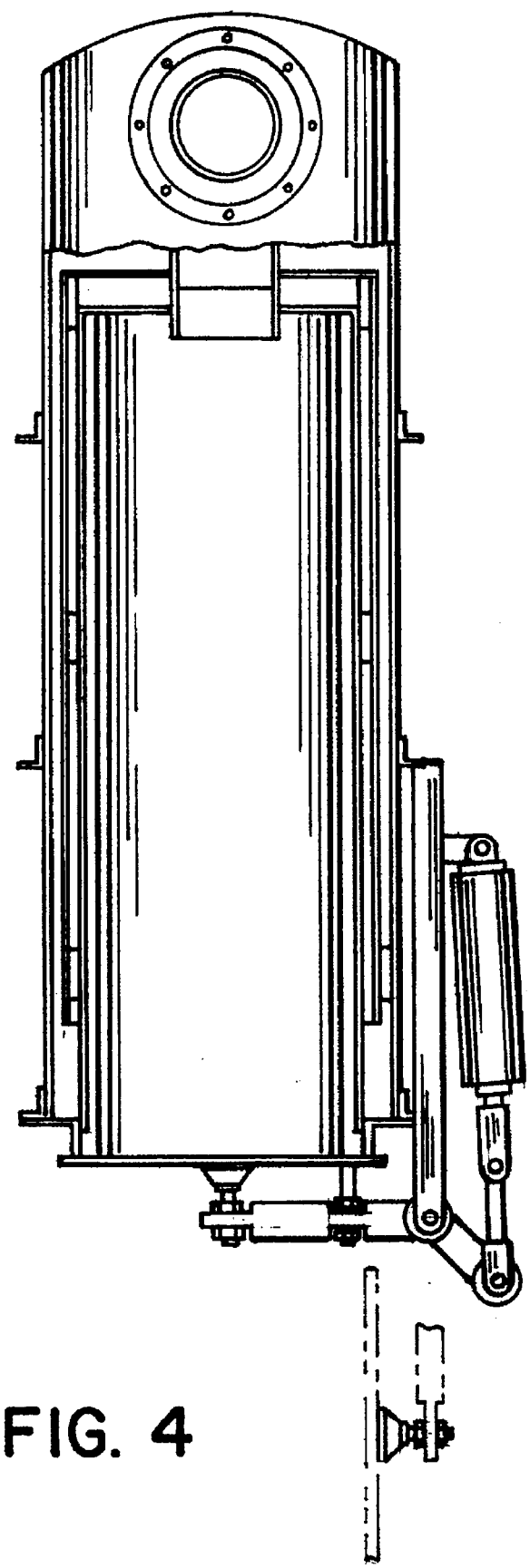
FIG. 4 is a front elevational view of one of the tanks comprising the present invention.
Figure 5:
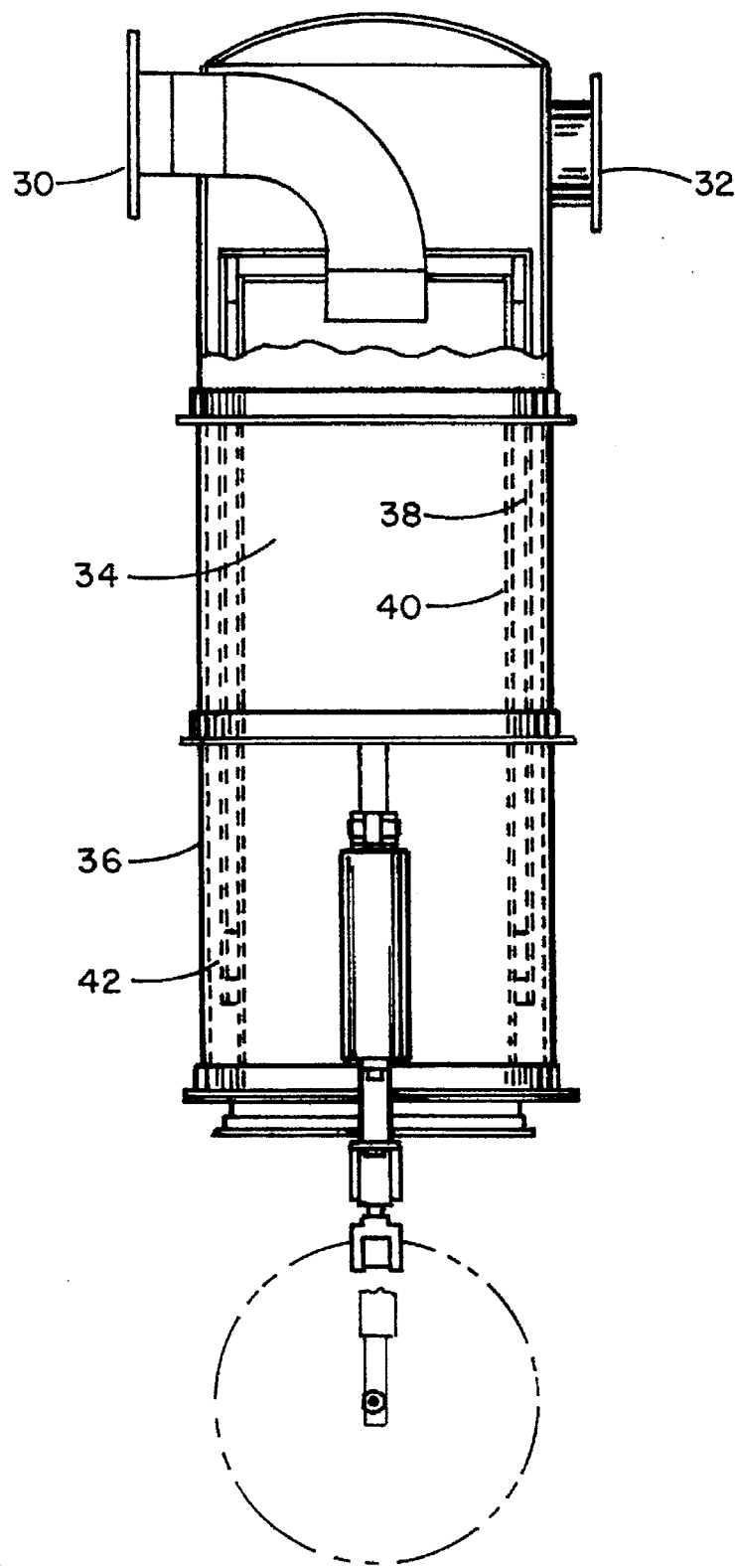
FIG. 5 is a side elevational view of the tank shown in FIG. 4.

Each of tanks 16, 18 have an internal construction like that shown in FIGS. 4 and 5. Cylindrical tank 16 has a casing inlet 30, an air outlet 32, a storage chamber 34, an exterior wall 36 and first and second interior walls 38, 40. Airblown casings are introduced into chamber 34 through opening 30, and air then flows through perforations in interior wall 40 into a circumferential passageway 42 formed by interior wall 38 and exterior wall 36. Air flows out of opening 32 induced by an appropriately positioned vacuum means. Door 44 opens and closes chamber 34 to evacuate collected casings when actuated by driving piston 48.

A collecting cart 52 is positioned beneath doors 44, 46 to receive the contents of the storage chamber as tanks 16, 18 are systematically evacuated and filled.

When collecting apparatus 10 is in the off position, doors 44, 46 are open and valves 24, 54 and 26 and 56 are open. When the apparatus is actuated and commences a run cycle, valves 26, 56 close, doors 44, 46 close, and tank 18 begins to fill with casings. When tank 18 is filled, valve 56 opens to evacuate air from tank 16, valve 26 opens, and valves 24, 54 close thereby permitting tank B to fill with casings. Door 46 then opens to empty casings from tank 18 and thereafter closes. Valve 54 then opens to evacuate air from tank 18. Valve 24 then opens and valves 26, 56 close to enable tank 18 to fill with casings. Upon completion of the filling operation, door 44 opens and casings empty from tank 16. Door 44 then closes and the cycle commences again and runs until the apparatus is placed in the off position.

The sequential filling of two separate tanks enable a continuous collecting operation to take place since one tank will be filling while the other is being emptied, thereby avoiding any downtime normally associated with the use of a single collecting tank. The double walled tanks enable an efficient and expeditious collection of casings that are firmly positioned within the tank, thus maximizing the tank capacity during the collecting operation.

Although a preferred embodiment has been shown and described, it will be obvious to those skilled in the art that the details of construction of this embodiment may be modified without departing from the concept presented. It is therefore intended that the invention be limited only by the scope of the appended claims rather than by particular details of construction shown.

What is claimed is:

1. Apparatus for collecting sausage casings or the like from a station where the casings are peeled from the sausage or the like comprising: plural tank means for receiving the peeled casings from the station where casings are peeled; conduit means connecting the peeling station with the plural tank means; means selectively opening one of the plural tank means while closing the other tank means including means selectively separating the peeled casing when one tank means is activated and the other tank means is deactivated; and a vacuum source for selectively creating a vacuum communicating with the plural tank means, conduit means and actuating means to move peelings selectively to each of the tank means for subsequent discharge.

2. The apparatus as claimed in claim 1 wherein each of the tank means includes a cylindrical tank having a casing inlet, casing outlet means, a storage chamber, and an exterior wall and first and second interior walls forming air flow passages within, each tank communicating with the vacuum source to draw the casings into the tank storage chamber through the casing inlet and collect a quantity of casings for subsequent selective discharge through the casing outlet means.

3. The apparatus as claimed in claim 1 wherein the casing separating means is a knife.

4. The apparatus as claimed in claim 2 wherein the casing separating means is a knife.

5. The apparatus as claimed in claim 2 wherein the outlet means is a selectively openable lid.

6. The apparatus as claimed in claim 1 further comprising means receiving casings discharged from the tanks and moving the received casings to a remote location.

7. The apparatus as claimed in claim 2 further comprising means receiving casings discharged from the tanks and moving the received casings to a remote location.

8. The apparatus as claimed in claim 3 further comprising means receiving casings discharged from the tanks and moving the received casings to a remote location.

9. The apparatus as claimed in claim 5 further comprising means receiving casings discharged from the tanks and moving the received casings to a remote location.

10. The apparatus as claimed in claim 2 wherein the first interior wall is perforated to permit air flow from the casing inlet and storage chamber therethrough, the second interior wall forms an air flow passage with the exterior wall to direct air flow induced by the vacuum to the casing outlet means.

11. The apparatus as claimed in claim 4 wherein the first interior wall is perforated to permit air flow from the casing inlet and storage chamber therethrough, the second interior wall forms an air flow passage with the exterior wall to direct air flow induced by the vacuum to the casing outlet means.

12. The apparatus as claimed in claim 5 wherein the first interior wall is perforated to permit air flow from the casing inlet and storage chamber therethrough, the second interior wall forms an air flow passage with the exterior wall to direct air flow induced by the vacuum to the casing outlet means.

13. The apparatus as claimed in claim 7 wherein the first interior wall is perforated to permit air flow from the casing inlet and storage chamber therethrough, the second interior wall forms an air flow passage with the exterior wall to direct air flow induced by the vacuum to the casing outlet means.

* * * * *